(12) United States Patent
Mo et al.

(10) Patent No.: US 9,091,870 B2
(45) Date of Patent: Jul. 28, 2015

(54) ILLUMINANCE ADJUSTING METHOD OF LIQUID CRYSTAL PHOTO ALIGNMENT IRRADIATION MACHINE

(71) Applicant: Shenzhen China Star Optoelectronics Technology Co., LTD., Shenzhen City, Guangdong Province (CN)

(72) Inventors: Shengpeng Mo, Shenzhen (CN); Wenpin Chiang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 396 days.

(21) Appl. No.: 13/807,300

(22) PCT Filed: Nov. 25, 2012

(86) PCT No.: PCT/CN2012/085228
§ 371 (c)(1),
(2) Date: Dec. 27, 2012

(87) PCT Pub. No.: WO2014/075340
PCT Pub. Date: May 22, 2014

(65) Prior Publication Data
US 2014/0141687 A1    May 22, 2014

(51) Int. Cl.
*H01J 9/42* (2006.01)
*G02F 1/13* (2006.01)
*G02F 1/1337* (2006.01)

(52) U.S. Cl.
CPC ........ *G02F 1/1303* (2013.01); *G02F 1/133788* (2013.01)

(58) Field of Classification Search
CPC ............ G02F 1/1303; G02F 1/133788; G02F 1/1337; G02F 1/13378

USPC ......... 445/60, 63; 349/124, 123; 430/20, 320, 430/321
See application file for complete search history.

(56) References Cited

U.S. PATENT DOCUMENTS 8,088,301 B2 * 1/2012 Yang et al. ................. 252/299.4
2004/0223112 A1   11/2004 Taniguchi et al.

FOREIGN PATENT DOCUMENTS

| CN | 101236321 A | 8/2008 |
| CN | 202403165 U | 8/2012 |
| JP | 2008-86890 A | 4/2008 |
| KR | 10-2005-0109260 A | 11/2005 |

* cited by examiner

*Primary Examiner* — Anh Mai
*Assistant Examiner* — Glenn Zimmerman
(74) *Attorney, Agent, or Firm* — Cheng-Ju Chiang

(57) ABSTRACT

The provides an illuminance adjusting method of a liquid crystal photo alignment irradiation machine, including (1) providing a liquid crystal photo alignment irradiation machine, which includes UV lamps, an illuminance collecting device, and a stage for supporting a liquid crystal panel; (2) the illuminance collecting device collecting information of illuminance and illuminance homogeneity of a surface of the stage; (3) calculating distance for the UV lamps to descend according to the information of illuminance and illuminance homogeneity of the surface of the stage; and (4) lowering down altitude of the UV lamps according to the descending distance. The method uses the illuminance collecting device to completely and intensively collect the information of illuminance and illuminance homogeneity of the stage surface and to automatically adjust the altitude of the UV lamps according to the information of illuminance and illuminance homogeneity so as to adjust the illuminance of the stage surface.

11 Claims, 5 Drawing Sheets

ILLUMINANCE ADJUSTING METHOD OF LIQUID CRYSTAL PHOTO ALIGNMENT IRRADIATION MACHINE

BACKGROUND OF THE INVENTION

1. Field of the Invention

The present invention relates to the field of liquid crystal display, and in particular to an illuminance adjusting method of a liquid crystal photo alignment irradiation machine.

2. The Related Arts

Liquid crystal displays (LCDs) have numerous advantages, such as thin device body, less power consumption, and being free of radiation, and is thus widely used. Most of the flat panel display devices available in the market are backlighting liquid crystal displays, which comprise a liquid crystal display panel and a backlight module. The operation principle of the liquid crystal display panel is that liquid crystal molecules are arranged between two parallel glass substrates and electricity is selectively applied to the glass substrates to control change of the orientation of the liquid crystal molecules in order to refract out the light from a backlight module for formation of an image.

Alignment control techniques are one of the most important essential techniques of the manufacture of liquid crystal display. The quality of image displayed on a liquid crystal display is related to whether the alignment of liquid crystal is done good or bad and high quality images can be presented only when the liquid crystal material of a panel shows stable and homogeneous alignment. Thin layers that are commonly used to align the liquid crystal molecules in a predetermined direction are referred to as alignment layers.

Referring to FIG. 1, the so-called HVA (High-Voltage-Activated) photo alignment is referred to irradiation of UV (Ultraviolet) light 700 to promote reaction of monomers 500 contained in the polymer inside a panel, under the condition of applying electrical voltage to substrates 100, so as to achieve the purposes of aligning the liquid crystal 300. Heretofore, HVA photo alignment techniques have been widely applied to high generation TFT-LCD business. To ensure that a specific alignment angle can be obtained by having liquid crystal irradiated with UV light without generating mura (which is referred to a phenomenon of various traces formed due to inhomogeneous brightness of a displaying device), irradiation homogeneity of UV light is a key factor. The UV light used in HVA photo alignment techniques is set to have illuminance within $85\pm10\%$ mW/cm$^2$. Heretofore, a UV lamp mounting frame of an alignment UV liquid crystal irradiation machine (UVM) is set at a fixed distance from a surface of a substrate support stage. However, with the use of the irradiation device, the illuminance on the surface of the stage will get deteriorated. The conventional UVM facility adopts two ways to increase the illuminance of the stage surface:

One is to increase the output power of the UV lamp in order to increase the illuminance of the stage surface. However, this shortens the lifespan of the UV lamp. The lifespan of the UV lamp may be reduced from 3000 h to 1500-2000 h.

The other one is to make minute adjustment of the orientation of the surrounding emission plates. However, this way only works for minute adjustment of illuminance and homogeneity of the illuminance and cannot greatly increase the illuminance.

SUMMARY OF THE INVENTION

An object of the present invention is to provide an illuminance adjusting method of a liquid crystal photo alignment irradiation machine, which collects illuminance information of a stage surface to adjust the vertical location of an ultraviolet lamp so as to achieve the purposes of automatically adjusting stage surface illuminance and greatly increase the lifespan of the UV lamp and thus, to some extents, reducing manufacturing cost.

To achieve the object, the present invention provides an illuminance adjusting method of a liquid crystal photo alignment irradiation machine, which comprises the following steps:

(1) providing a liquid crystal photo alignment irradiation machine, wherein the liquid crystal photo alignment irradiation machine comprises an irradiation machine body and an illuminance collecting device and a plurality of UV lamps mounted on the irradiation machine body, the irradiation machine body comprising a stage for supporting a liquid crystal panel, the illuminance collecting device being arranged on the stage;

(2) the illuminance collecting device collecting information of illuminance and illuminance homogeneity of a surface the stage;

(3) calculating distance for the UV lamps to descend according to the information of illuminance and illuminance homogeneity of the surface of the stage; and (4) lowering down altitude of the UV lamps according to the descending distance.

The irradiation machine body comprises a microprocessor, a power supply unit electrically connected to the microprocessor, a storage unit electrically connected to the microprocessor. The illuminance collecting device is electrically connected to the microprocessor. The storage unit functions to store an average surface illuminance reference of the stage and a correlation table of average illuminance deterioration value and UV lamp mounting frame descending value. The plurality of UV lamps is electrically connected to the microprocessor.

Operation of step (2) is such that the microprocessor controls the illuminance collecting device to periodically, completely, and intensively collect the information of illuminance and illuminance homogeneity of the surface of the stage and transmit the information of illuminance and illuminance homogeneity to the microprocessor.

Step (3) Comprises the Following Steps:

(3.1) the microprocessor receiving the information of illuminance and illuminance homogeneity and calculating average illuminance and illuminance homogeneity of the surface of the stage;

(3.2) the microprocessor comparing the average illuminance with the average illuminance reference stored in the storage unit;

(3.3) controlling the illuminance collecting device to periodically, completely, and intensively collect information of illuminance and illuminance homogeneity of the surface of the stage, if the average illuminance is greater than the average illuminance reference; and (3.4) calculating an average illuminance deterioration value, if the average illuminance is less than or equal to the average illuminance reference, and calculating a UV lamp descending distance according to a correlation table of average illuminance deterioration value and UV lamp descending value.

The liquid crystal photo alignment irradiation machine further comprises a UV lamp mounting frame mounted on the irradiation machine body. The plurality of UV lamps is mounted on the UV lamp mounting frame.

The UV lamp mounting frame comprises a bracket, a mounting brace mounted to a top of the bracket, reflection plates mounted to four sides of front, rear, left, and right sides of the bracket, and a cooling unit mounted to the bracket. The plurality of UV lamps is mounted to a bottom surface of the bracket. The cooling unit is electrically connected to the microprocessor. The UV lamp mounting frame is mounted to the irradiation machine body by the mounting brace in an ascendable and descendible manner.

The UV lamp mounting frame comprises a control unit arranged inside the bracket. The control unit is electrically connected to the microprocessor.

The mounting brace comprises a servo motor electrically connected to the control unit and a plurality of synchronous motors electrically connected to the control unit. The servo motor and the plurality of synchronous motors each have an end fixed to the bracket and an opposite end fixed to the irradiation machine body.

The synchronous motors are of a number of four, which are respectively arranged at four corners of the bracket to show a rectangular configuration. The servo motor is arranged at a center of the bracket.

Operation of step (4) is such that the microprocessor transmits the average illuminance deterioration value and the descending distance to the control unit and the control unit drives the servo motor and the synchronous motors to lower down the altitude of the UV lamp mounting frame according to the average illuminance deterioration value and the descending distance so as to adjust the illuminance on the surface of the stage.

The present invention also provides an illuminance adjusting method of a liquid crystal photo alignment irradiation machine, which comprises the following steps:

(1) providing a liquid crystal photo alignment irradiation machine, wherein the liquid crystal photo alignment irradiation machine comprises an irradiation machine body and an illuminance collecting device and a plurality of UV lamps mounted on the irradiation machine body, the irradiation machine body comprising a stage for supporting a liquid crystal panel, the illuminance collecting device being arranged on the stage;

(2) the illuminance collecting device collecting information of illuminance and illuminance homogeneity of a surface the stage;

(3) calculating distance for the UV lamps to descend according to the information of illuminance and illuminance homogeneity of the surface of the stage; and (4) lowering down altitude of the UV lamps according to the descending distance;

wherein the irradiation machine body comprises a microprocessor, a power supply unit electrically connected to the microprocessor, a storage unit electrically connected to the microprocessor, the illuminance collecting device being electrically connected to the microprocessor, the storage unit functioning to store an average surface illuminance reference of the stage and a correlation table of average illuminance deterioration value and UV lamp mounting frame descending value, the plurality of UV lamps being electrically connected to the microprocessor;

wherein operation of step (2) is such that the microprocessor controls the illuminance collecting device to periodically, completely, and intensively collect the information of illuminance and illuminance homogeneity of the surface of the stage and transmit the information of illuminance and illuminance homogeneity to the microprocessor;

wherein step (3) comprises the following steps:

(3.1) the microprocessor receiving the information of illuminance and illuminance homogeneity and calculating average illuminance and illuminance homogeneity of the surface of the stage, (3.2) the microprocessor comparing the average illuminance with the average illuminance reference stored in the storage unit, (3.3) controlling the illuminance collecting device to periodically, completely, and intensively collect information of illuminance and illuminance homogeneity of the surface of the stage, if the average illuminance is greater than the average illuminance reference, and (3.4) calculating an average illuminance deterioration value, if the average illuminance is less than or equal to the average illuminance reference, and calculating a UV lamp descending distance according to a correlation table of average illuminance deterioration value and UV lamp descending value;

wherein the liquid crystal photo alignment irradiation machine further comprises a UV lamp mounting frame mounted on the irradiation machine body, the plurality of UV lamps being mounted on the UV lamp mounting frame;

wherein the UV lamp mounting frame comprises a bracket, a mounting brace mounted to a top of the bracket, reflection plates mounted to four sides of front, rear, left, and right sides of the bracket, and a cooling unit mounted to the bracket, the plurality of UV lamps being mounted to a bottom surface of the bracket, the cooling unit being electrically connected to the microprocessor, the UV lamp mounting frame being mounted to the irradiation machine body by the mounting brace in an ascendable and descendible manner;

wherein the UV lamp mounting frame comprises a control unit arranged inside the bracket, the control unit being electrically connected to the microprocessor;

wherein the mounting brace comprises a servo motor electrically connected to the control unit and a plurality of synchronous motors electrically connected to the control unit, the servo motor and the plurality of synchronous motors each having an end fixed to the bracket and an opposite end fixed to the irradiation machine body;

wherein the synchronous motors are of a number of four, which are respectively arranged at four corners of the bracket to show a rectangular configuration, the servo motor being arranged at a center of the bracket; and wherein operation of step (4) is such that the microprocessor transmits the average illuminance deterioration value and the descending distance to the control unit and the control unit drives the servo motor and the synchronous motors to lower down the altitude of the UV lamp mounting frame according to the average illuminance deterioration value and the descending distance so as to adjust the illuminance on the surface of the stage.

The efficacy of the present invention is that the present invention provides an illuminance adjusting method of a liquid crystal photo alignment irradiation machine, which applies an illuminance collecting device mounted on a stage to completely and intensively collect the information of illuminance and illuminance homogeneity of the surface of the stage and to automatically adjust the altitude of the UV lamps according to the information of illuminance and illuminance homogeneity so as to achieve the purposes of automatically adjusting the illuminance of the surface of the stage to greatly extend the lifespan of the UV lamp and to reduce, to some extents, the manufacturing cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
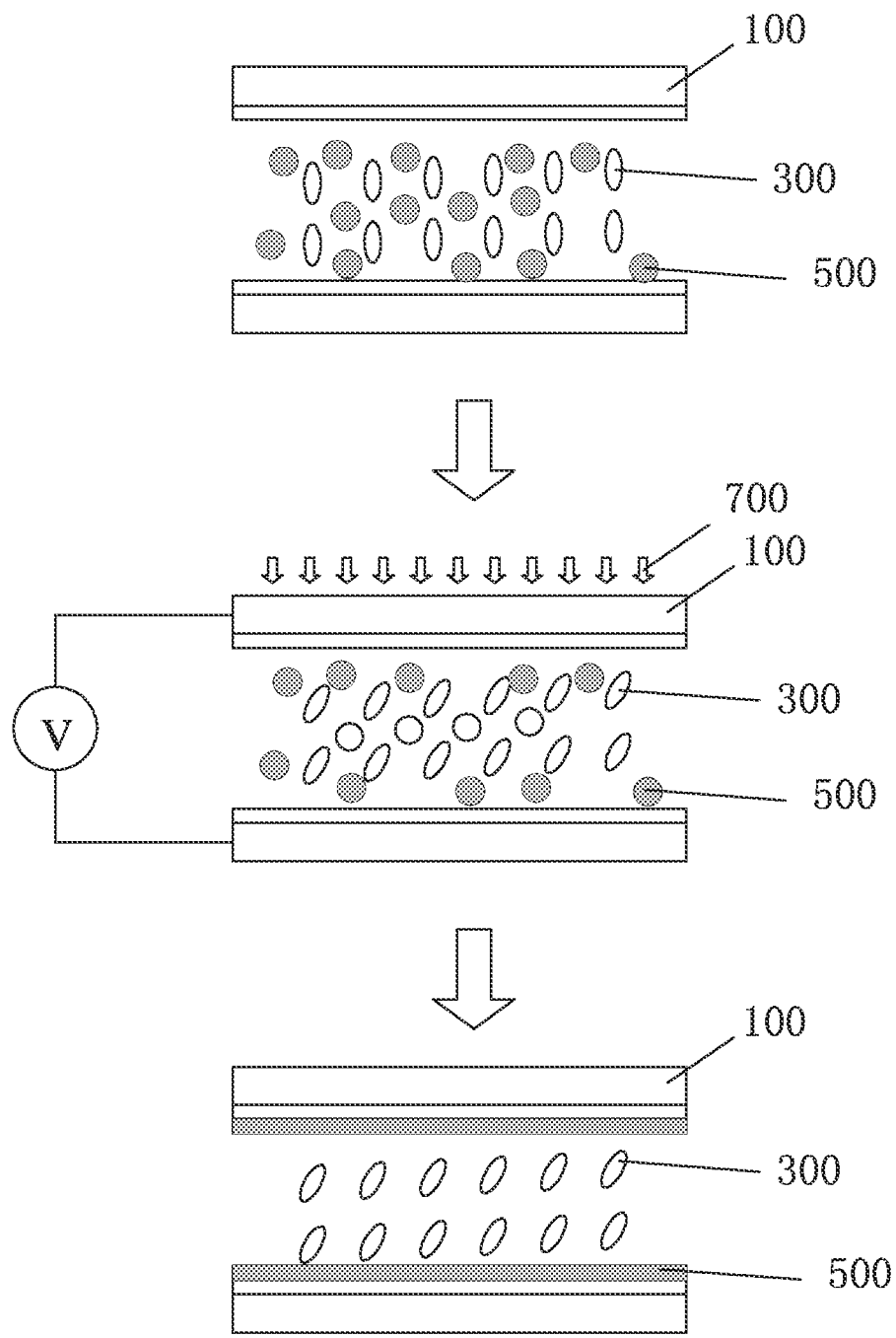
FIG. 1 is a view illustrating the principle of the conventional HVA (High-Voltage-Activated) photo alignment technique.
Figure 2:
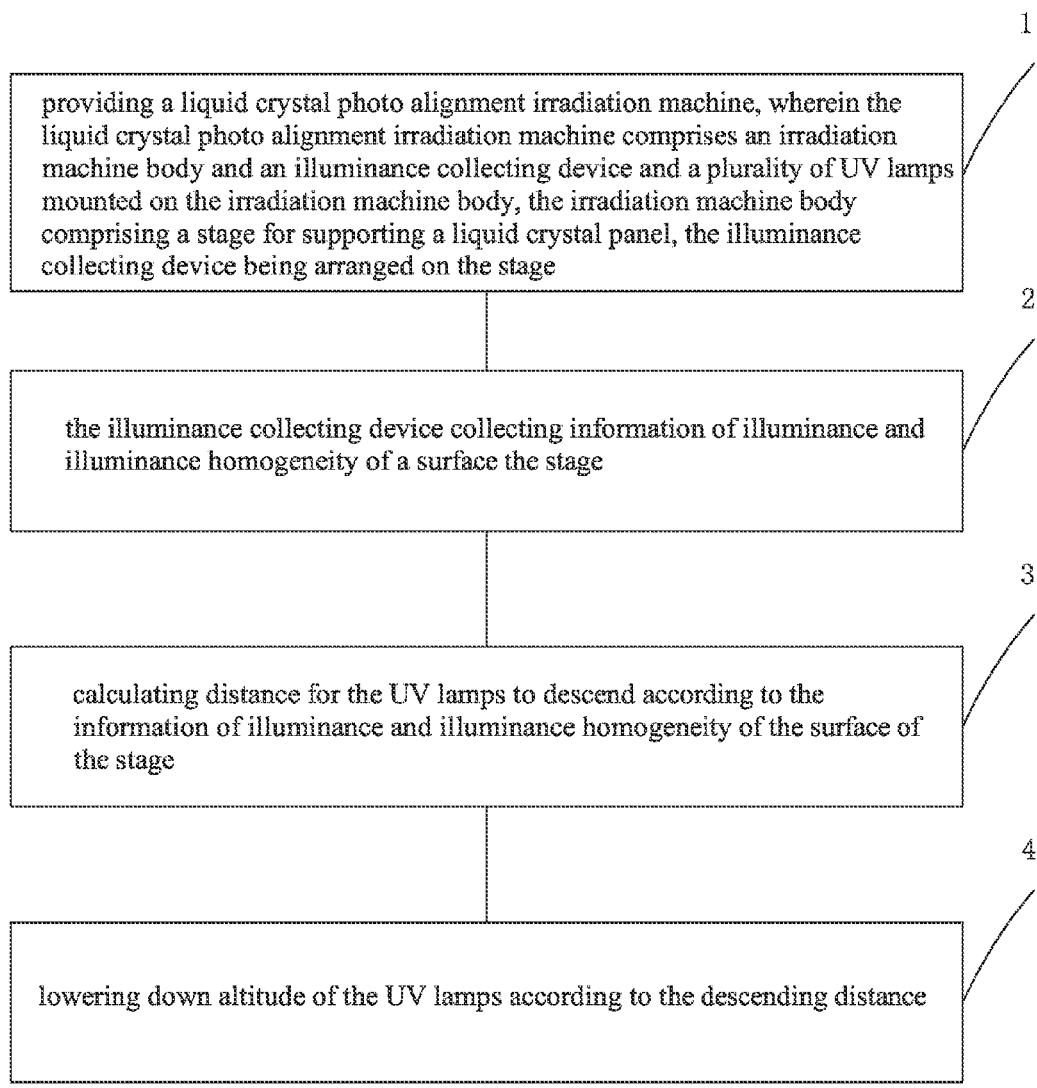
FIG. 2 is a flow chart illustrating an illuminance adjusting method of a liquid crystal photo alignment irradiation machine according to the present invention.
Figure 3:
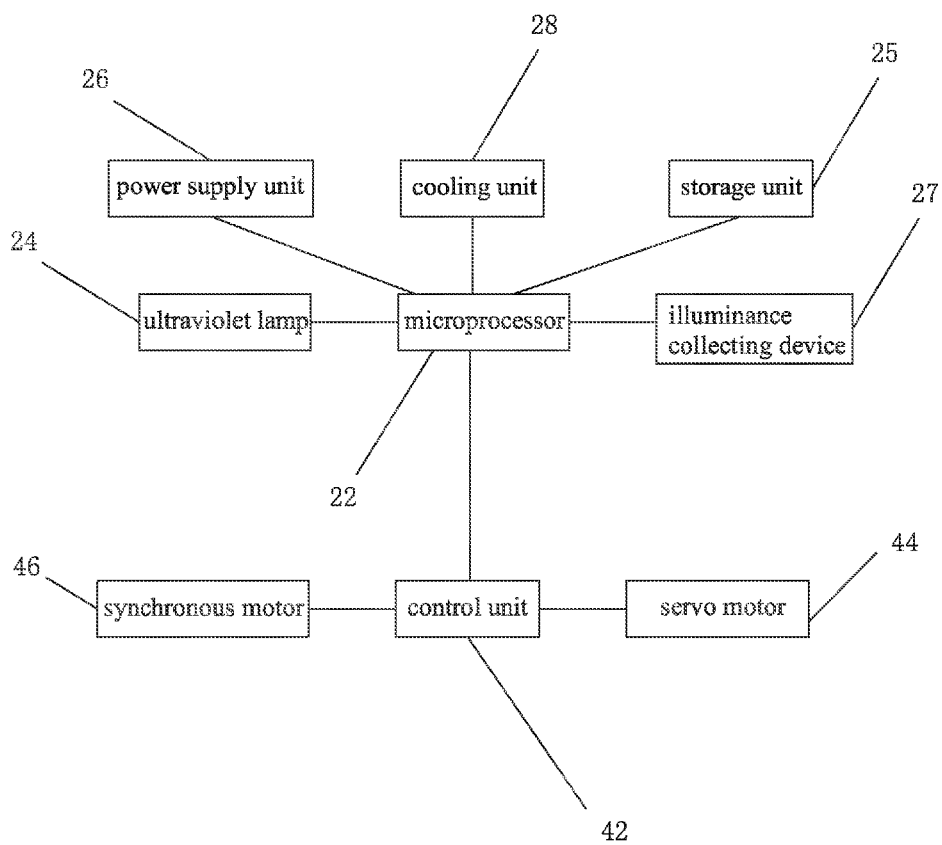
FIG. 3 is a block diagram of a circuit used in the illuminance adjusting method of a liquid crystal photo alignment irradiation machine according to the present invention.
Figure 4:
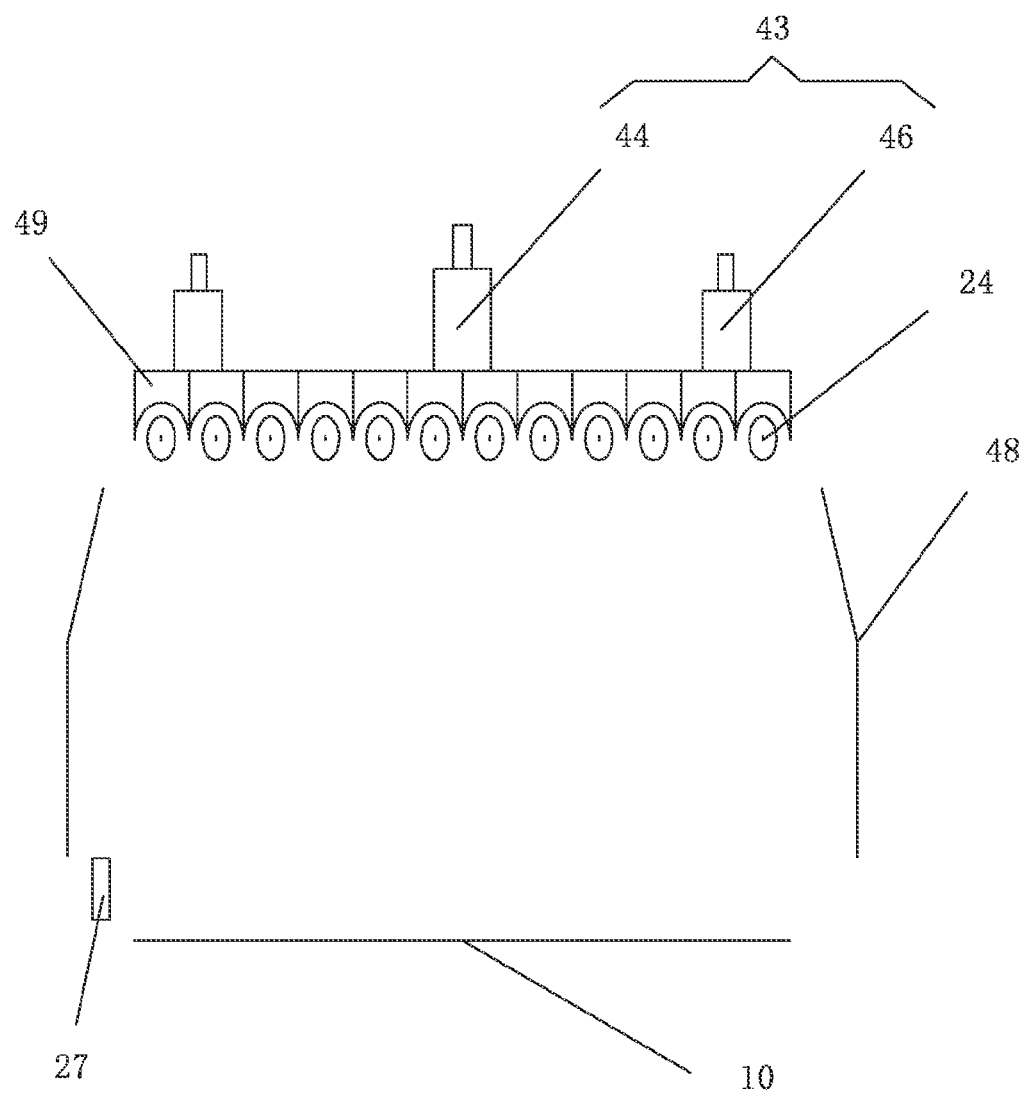
FIG. 4 is a schematic view showing the structure of an ultraviolet lamp mounting frame used in the illuminance adjusting method of a liquid crystal photo alignment irradiation machine according to the present invention.
Figure 5:
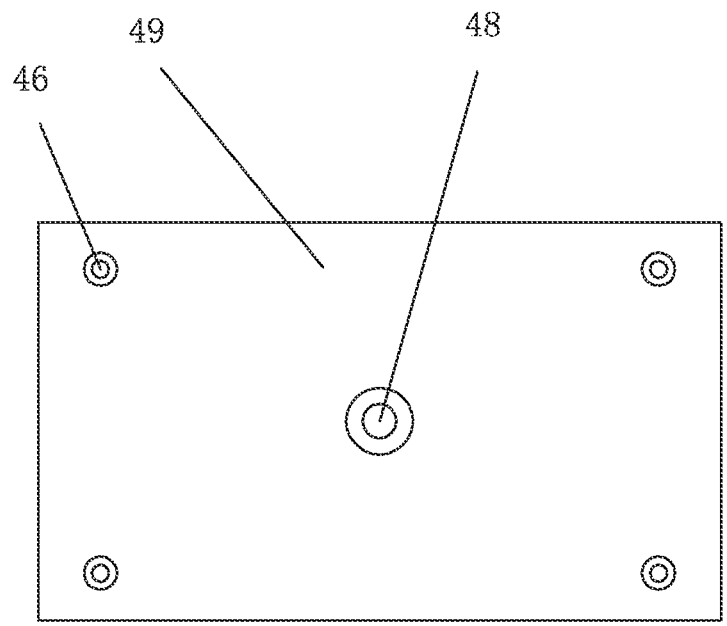
FIG. 5 is a top plan view of the ultraviolet lamp mounting structure of FIG. 4.

Referring to FIGS. 2-5, the present invention provides an illuminance adjusting method of a liquid crystal photo alignment irradiation machine, which comprises the following steps:

Step 1: providing a liquid crystal photo alignment irradiation machine, wherein the liquid crystal photo alignment irradiation machine comprises an irradiation machine body (not shown) and an illuminance collecting device 27 and a plurality of UV lamps 24 mounted on the irradiation machine body, the irradiation machine body comprising a stage 10 for supporting a liquid crystal panel, the illuminance collecting device 27 being arranged on the stage 10.

The irradiation machine body comprises a facility computation system. The facility computation system comprises a microprocessor 22, a power supply unit 26 electrically connected to the microprocessor 22, a storage unit 25 electrically connected to the microprocessor 22. The illuminance collecting device 27 is electrically connected to the microprocessor 22. The storage unit 25 functions to store an average surface illuminance reference of the stage 10 and a correlation table of average illuminance deterioration value and UV lamp mounting frame descending value. In the subsequent step, the microprocessor 22 may directly acquire from the correlation table a necessary descending distance n for the UV lamp mounting frame by applying a difference of average illuminance deterioration value, wherein the correlative relationship between the average illuminance deterioration value and the UV lamp descending value of the correlation table is set according to practical requirements. The average surface illuminance reference of the stage 10 is 85±10% mW/cm². The plurality of UV lamps 24 is electrically connected to the microprocessor 22 to allow the microprocessor 22 to control the operation thereof. In the instant preferred embodiment, the UV lamps 24 are of a number twelve.

The liquid crystal photo alignment irradiation machine further comprises a UV lamp mounting frame mounted on the irradiation machine body. The plurality of UV lamps 24 is mounted on the UV lamp mounting frame. The UV lamp mounting frame comprises a bracket 49, a mounting brace 43 mounted to a top of the bracket 49, reflection plates 48 mounted to four sides of front, rear, left, and right sides of the bracket 49, and a cooling unit 28 mounted to the bracket 49. The plurality of UV lamps 24 is mounted to a bottom surface of the bracket 49. The cooling unit 28 is electrically connected to the microprocessor 22 to allow the microprocessor 22 to control the operation thereof. The UV lamp mounting frame is mounted to the irradiation machine body by the mounting brace 43 in an ascendable and descendible manner. The cooling unit 28 functions to lower down the temperature of the plurality of UV lamps 24 to keep the UV lamps 24 operating in a safe range and ensure the lifespan thereof. The reflection plates 48 reflect ultraviolet light incident onto the reflection plates 48 back to the liquid crystal panel to increase light utilization.

The UV lamp mounting frame comprises a control unit 42 arranged inside the bracket 49. The control unit 42 is electrically connected to the microprocessor 33. The mounting brace 43 comprises a servo motor 44 electrically connected to the control unit 42 and a plurality of synchronous motors 46 electrically connected to the control unit 42. The servo motor 44 and the plurality of synchronous motors 46 each have an end fixed to the bracket 49 and an opposite end fixed to the irradiation machine body, whereby the control unit 42 may use the amount of extension/retraction of the servo motor 44 and the synchronous motors 46 to control the descending distance of the UV lamp mounting frame. In the instant preferred embodiment, the synchronous motors 46 are of a number of four, which are respectively arranged at four corners of the bracket 49 to show a rectangular configuration. The servo motor 44 is arranged at a center of the bracket 49.

Step 2: the illuminance collecting device 27 collecting information of illuminance and illuminance homogeneity of a surface the stage 10.

The operation of Step 2 is such that the microprocessor 22 controls the illuminance collecting device to periodically and completely collect the information of illuminance and illuminance homogeneity of the surface of the stage 10 and transmit the information of illuminance and illuminance homogeneity to the microprocessor 22. In the instant preferred embodiment, the period with which the illuminance collecting device 27 completely and intensively collect the information of surface illuminance and illuminance homogeneity of the stage 10 can be set with the microprocessor 22 as desired, such collecting every 12 hours.

Step 3: calculating distance for the UV lamps to descend according to the information of illuminance and illuminance homogeneity of the surface of the stage.

Step 3 comprises the following steps:

Step 3.1: the microprocessor 22 receiving the information of illuminance and illuminance homogeneity and calculating average illuminance and illuminance homogeneity of the surface of the stage 10.

Step 3.2: the microprocessor 22 comparing the average illuminance with the average illuminance reference stored in the storage unit 25.

The microprocessor 22 retrieves the average illuminance reference from the storage unit 25 and proceeds with comparison between the average illuminance and the average illuminance reference.

Step 3.3: controlling the illuminance collecting device 27 to periodically, completely, and intensively collect information of illuminance and illuminance homogeneity of the surface of the stage 10, if the average illuminance is greater than the average illuminance reference.

If the average illuminance is greater than the average illuminance reference, then the microprocessor 22 controls the illuminance collecting device 27 to perform periodic, complete, and intensive collection of the information of illuminance and illuminance homogeneity of the surface of the stage 10 in a cyclic mannerly until the collected average illuminance is less than or equal to the average illuminance reference.

Step 3.4: calculating an average illuminance deterioration value, if the average illuminance is less than or equal to the average illuminance reference, and calculating a UV lamp descending distance n according to a correlation table of average illuminance deterioration value and UV lamp descending value.

The average illuminance deterioration value is equal to the average illuminance reference minus the average illuminance. The average illuminance deterioration value is used to check the correlation table of average illuminance deterioration value and UV lamp descending value to obtain the descending distance n of the UV lamps.

Step 4: lowering down altitude of the UV lamps according to the descending distance.

The operation of Step 4 is such that the microprocessor 22 transmits the average illuminance deterioration value and the descending distance n to the control unit 42 and the control unit 42 drives the servo motor 44 and the synchronous motors 46 to lower down the altitude of the UV lamp mounting frame according to the average illuminance deterioration value and the descending distance, namely reducing the altitude of the UV lamps 24, so as to adjust the illuminance on the surface of the stage 10.

In summary, the present invention provides an illuminance adjusting method of a liquid crystal photo alignment irradiation machine, which applies an illuminance collecting device mounted on a stage to completely and intensively collect the information of illuminance and illuminance homogeneity of the surface of the stage and to automatically adjust the altitude of the UV lamps according to the information of illuminance and illuminance homogeneity so as to achieve the purposes of automatically adjusting the illuminance of the surface of the stage to greatly extend the lifespan of the UV lamp and to reduce, to some extents, the manufacturing cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An illuminance adjusting method of a liquid crystal photo alignment irradiation machine, comprising the following steps:
    (1) providing a liquid crystal photo alignment irradiation machine, wherein the liquid crystal photo alignment irradiation machine comprises an irradiation machine body and an illuminance collecting device and a plurality of UV lamps mounted on the irradiation machine body, the irradiation machine body comprising a stage for supporting a liquid crystal panel, the illuminance collecting device being arranged on the stage;
    (2) the illuminance collecting device collecting information of illuminance and illuminance homogeneity of a surface of the stage;
    (3) calculating distance for the UV lamps to descend according to the information of illuminance and illuminance homogeneity of the surface of the stage; and
    (4) lowering down altitude of the UV lamps according to the descending distance.

2. The illuminance adjusting method of a liquid crystal photo alignment irradiation machine as claimed in claim 1, wherein the irradiation machine body comprises a microprocessor, a power supply unit electrically connected to the microprocessor, a storage unit electrically connected to the microprocessor, the illuminance collecting device being electrically connected to the microprocessor, the storage unit functioning to store an average surface illuminance reference of the stage and a correlation table of average illuminance deterioration value and UV lamp mounting frame descending value, the plurality of UV lamps being electrically connected to the microprocessor.

3. The illuminance adjusting method of a liquid crystal photo alignment irradiation machine as claimed in claim 2, wherein operation of step (2) is such that the microprocessor controls the illuminance collecting device to periodically, completely, and intensively collect the information of illuminance and illuminance homogeneity of the surface of the stage and transmit the information of illuminance and illuminance homogeneity to the microprocessor.

4. The illuminance adjusting method of a liquid crystal photo alignment irradiation machine as claimed in claim 2, wherein step (3) comprises the following steps:
    (3.1) the microprocessor receiving the information of illuminance and illuminance homogeneity and calculating average illuminance and illuminance homogeneity of the surface of the stage;
    (3.2) the microprocessor comparing the average illuminance with the average illuminance reference stored in the storage unit;
    (3.3) controlling the illuminance collecting device to periodically, completely, and intensively collect information of illuminance and illuminance homogeneity of the surface of the stage, if the average illuminance is greater than the average illuminance reference; and
    (3.4) calculating an average illuminance deterioration value, if the average illuminance is less than or equal to the average illuminance reference, and calculating a UV lamp descending distance according to a correlation table of average illuminance deterioration value and UV lamp descending value.

5. The illuminance adjusting method of a liquid crystal photo alignment irradiation machine as claimed in claim 1, wherein the liquid crystal photo alignment irradiation machine further comprises a UV lamp mounting frame mounted on the irradiation machine body, the plurality of UV lamps being mounted on the UV lamp mounting frame.

6. The illuminance adjusting method of a liquid crystal photo alignment irradiation machine as claimed in claim 5, wherein the UV lamp mounting frame comprises a bracket, a mounting brace mounted to a top of the bracket, reflection plates mounted to four sides of front, rear, left, and right sides of the bracket, and a cooling unit mounted to the bracket, the plurality of UV lamps being mounted to a bottom surface of the bracket, the cooling unit being electrically connected to a microprocessor, the UV lamp mounting frame being mounted to the irradiation machine body by the mounting brace in an ascendable and descendible manner.

7. The illuminance adjusting method of a liquid crystal photo alignment irradiation machine as claimed in claim 6, wherein the UV lamp mounting frame comprises a control unit arranged inside the bracket, the control unit being electrically connected to the microprocessor.

8. The illuminance adjusting method of a liquid crystal photo alignment irradiation machine as claimed in claim 7, wherein the mounting brace comprises a servo motor electrically connected to the control unit and a plurality of synchronous motors electrically connected to the control unit, the servo motor and the plurality of synchronous motors each having an end fixed to the bracket and an opposite end fixed to the irradiation machine body.

9. The illuminance adjusting method of a liquid crystal photo alignment irradiation machine as claimed in claim 8, wherein the synchronous motors are of a number of four, which are respectively arranged at four corners of the bracket to show a rectangular configuration, the servo motor being arranged at a center of the bracket.

10. The illuminance adjusting method of a liquid crystal photo alignment irradiation machine as claimed in claim 8, wherein operation of step (4) is such that the microprocessor transmits the average illuminance deterioration value and the descending distance to the control unit and the control unit drives the servo motor and the synchronous motors to lower down the altitude of the UV lamp mounting frame according to the average illuminance deterioration value and the descending distance so as to adjust the illuminance on the surface of the stage.

11. An illuminance adjusting method of a liquid crystal photo alignment irradiation machine, comprising the following steps:
   (1) providing a liquid crystal photo alignment irradiation machine, wherein the liquid crystal photo alignment irradiation machine comprises an irradiation machine body and an illuminance collecting device and a plurality of UV lamps mounted on the irradiation machine body, the irradiation machine body comprising a stage for supporting a liquid crystal panel, the illuminance collecting device being arranged on the stage;
   (2) the illuminance collecting device collecting information of illuminance and illuminance homogeneity of a surface the stage;
   (3) calculating distance for the UV lamps to descend according to the information of illuminance and illuminance homogeneity of the surface of the stage; and
   (4) lowering down altitude of the UV lamps according to the descending distance;
   wherein the irradiation machine body comprises a microprocessor, a power supply unit electrically connected to the microprocessor, a storage unit electrically connected to the microprocessor, the illuminance collecting device being electrically connected to the microprocessor, the storage unit functioning to store an average surface illuminance reference of the stage and a correlation table of average illuminance deterioration value and UV lamp mounting frame descending value, the plurality of UV lamps being electrically connected to the microprocessor;
   wherein operation of step (2) is such that the microprocessor controls the illuminance collecting device to periodically, completely, and intensively collect the information of illuminance and illuminance homogeneity of the surface of the stage and transmit the information of illuminance and illuminance homogeneity to the microprocessor;
   wherein step (3) comprises the following steps:
   (3.1) the microprocessor receiving the information of illuminance and illuminance homogeneity and calculating average illuminance and illuminance homogeneity of the surface of the stage;
   (3.2) the microprocessor comparing the average illuminance with the average illuminance reference stored in the storage unit;
   (3.3) controlling the illuminance collecting device to periodically, completely, and intensively collect information of illuminance and illuminance homogeneity of the surface of the stage, if the average illuminance is greater than the average illuminance reference; and
   (3.4) calculating an average illuminance deterioration value, if the average illuminance is less than or equal to the average illuminance reference, and calculating a UV lamp descending distance according to a correlation table of average illuminance deterioration value and UV lamp descending value;
   wherein the liquid crystal photo alignment irradiation machine further comprises a UV lamp mounting frame mounted on the irradiation machine body, the plurality of UV lamps being mounted on the UV lamp mounting frame;
   wherein the UV lamp mounting frame comprises a bracket, a mounting brace mounted to a top of the bracket, reflection plates mounted to four sides of front, rear, left, and right sides of the bracket, and a cooling unit mounted to the bracket, the plurality of UV lamps being mounted to a bottom surface of the bracket, the cooling unit being electrically connected to the microprocessor, the UV lamp mounting frame being mounted to the irradiation machine body by the mounting brace in an ascendable and descendible manner;
   wherein the UV lamp mounting frame comprises a control unit arranged inside the bracket, the control unit being electrically connected to the microprocessor;
   wherein the mounting brace comprises a servo motor electrically connected to the control unit and a plurality of synchronous motors electrically connected to the control unit, the servo motor and the plurality of synchronous motors each having an end fixed to the bracket and an opposite end fixed to the irradiation machine body;
   wherein the synchronous motors are of a number of four, which are respectively arranged at four corners of the bracket to show a rectangular configuration, the servo motor being arranged at a center of the bracket; and
   wherein operation of step (4) is such that the microprocessor transmits the average illuminance deterioration value and the descending distance to the control unit and the control unit drives the servo motor and the synchronous motors to lower down the altitude of the UV lamp mounting frame according to the average illuminance deterioration value and the descending distance so as to adjust the illuminance on the surface of the stage.

* * * * *